(12) United States Patent
Cui et al.

(10) Patent No.: US 7,733,892 B2
(45) Date of Patent: Jun. 8, 2010

(54) BUFFER MANAGEMENT METHOD BASED ON A BITMAP TABLE

(75) Inventors: Jingjie Cui, Shenzhen (CN); Yu Lin, Shenzhen (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 313 days.

(21) Appl. No.: 11/773,733

(22) Filed: Jul. 5, 2007

(65) Prior Publication Data

US 2007/0274303 A1 Nov. 29, 2007

Related U.S. Application Data

(63) Continuation of application No. PCT/CN2005/002220, filed on Dec. 16, 2005.

(30) Foreign Application Priority Data

Jan. 5, 2005 (CN) .................... 2005 1 0000145

(51) Int. Cl.
*H04L 12/28* (2006.01)
(52) U.S. Cl. .................. 370/412; 370/230; 370/234; 370/389; 370/395.4; 375/240.28; 375/293
(58) Field of Classification Search .................. None
See application file for complete search history.

(56) References Cited

U.S. PATENT DOCUMENTS

| 5,005,167 | A | * | 4/1991 | Arthurs et al. ................. 398/54 |
| 5,068,892 | A | * | 11/1991 | Livanos ................. 379/112.01 |
| 5,535,197 | A | * | 7/1996 | Cotton ................... 370/395.72 |
| 5,610,914 | A | * | 3/1997 | Yamada .................. 370/395.72 |
| 5,659,794 | A | * | 8/1997 | Caldarale et al. ............... 710/1 |

(Continued)

FOREIGN PATENT DOCUMENTS

CN 1661568 A 8/2005

(Continued)

OTHER PUBLICATIONS

International Search Report from PCT Application No. PCT/CN2005/002220.

*Primary Examiner*—Salman Ahmed
*Assistant Examiner*—Andrew C Lee

(57) ABSTRACT

A buffer management method based on a bitmap table includes: dividing the bitmap table into a plurality of areas each containing at least one bit; determining and recording an idleness status of each of the areas in accordance with an unoccupied status of the bit in the area; and performing a management on a buffer address pointer in accordance with the recorded idleness status of each of the areas. The entire inventive procedure of allocating a buffer address pointer is fixed and easily controllable, and the RAM consumed for management on each buffer element including at least a 1-bit buffer space is approximately 1 bit, with a relatively fewer resources being consumed. The invention can enable that it takes two clock cycles on average to complete one procedure of allocating a buffer address pointer, and thus the efficiency in allocating and reclaiming a buffer address pointer is high, and the controllability during buffer management is improved. In the case that as a few as possible resources are consumed, the capability in buffer management is improved to a maximal extent, and hence the inventive can satisfy the demand of a large bandwidth for a large buffer.

18 Claims, 5 Drawing Sheets

U.S. PATENT DOCUMENTS

| | | | |
|---|---|---|---|
| 5,781,549 A * | 7/1998 | Dai | 370/398 |
| 6,310,875 B1 * | 10/2001 | Nichols et al. | 370/388 |
| 6,657,959 B1 * | 12/2003 | Chong et al. | 370/230.1 |
| 6,958,973 B1 * | 10/2005 | Chen et al. | 370/235 |
| 7,003,597 B2 * | 2/2006 | Georgiou et al. | 710/56 |
| 7,031,331 B2 * | 4/2006 | Schaub | 370/412 |
| 7,050,440 B2 * | 5/2006 | Colmant et al. | 370/395.1 |
| 7,075,938 B1 * | 7/2006 | Takada et al. | 370/395.71 |
| 7,210,001 B2 * | 4/2007 | Frey et al. | 711/100 |
| 7,287,061 B2 * | 10/2007 | Tsubota | 709/207 |
| 7,417,986 B1 * | 8/2008 | Sandoval et al. | 370/381 |
| 7,536,488 B2 * | 5/2009 | Chen et al. | 710/56 |
| 2002/0131419 A1 * | 9/2002 | Tamai | 370/395.4 |
| 2003/0041253 A1 | 2/2003 | Matsui et al. | |
| 2005/0008011 A1 * | 1/2005 | Georgiou et al. | 370/389 |

FOREIGN PATENT DOCUMENTS

| | | |
|---|---|---|
| EP | 0859534 A2 | 8/1998 |

* cited by examiner

FIFO address    FIFO content

| | |
|---|---|
| 8K-1 | 9 |
| 8K-2 | 22 |
| 8K-3 | 8K-2 |
| ⋮ | ⋮ |
| 2 | 54 |
| 1 | 687 |
| 0 | 145 |

Fig.3

Row address

| | | | | | | | |
|---|---|---|---|---|---|---|---|
| 255 | 0 | 0 | 0 | ...... | 0 | 0 | 0 |
| 254 | 0 | 0 | 0 | ...... | 0 | 0 | 0 |
| ⋮ | | | | ...... | | | |
| 1 | 0 | 0 | 0 | ...... | 0 | 0 | 0 |
| 0 | 1 | 1 | 1 | ...... | 1 | 1 | 1 |
| | 0 | 1 | 2 | | 29 | 30 | 31 |

Column address

Fig.4

Row address

| 255 | 0 | 0 | 1 | ...... | 0 | 0 | 1 |
| --- | --- | --- | --- | --- | --- | --- | --- |
| 254 | 0 | 0 | 0 | ...... | 0 | 0 | 0 |
| ⋮ | | | | ...... | | | |
| 1 | 0 | 1 | 1 | ...... | 1 | 1 | 0 |
| 0 | 1 | 0 | 1 | ...... | 0 | 1 | 0 |
| | 0 | 1 | 2 | | 29 | 30 | 31 | Column address |

Fig.5

Row address

| 255 | 0 | 0 | 0 | ...... | 0 | 0 | 0 |
| --- | --- | --- | --- | --- | --- | --- | --- |
| 254 | 0 | 0 | 0 | ...... | 0 | 0 | 0 |
| ⋮ | | | | ...... | | | |
| 1 | 0 | 0 | 0 | ...... | 0 | 0 | 0 |
| 0 | 0 | 0 | 0 | ...... | 0 | 0 | 0 |
| | 0 | 1 | 2 | | 29 | 30 | 31 | Column address |

Fig.6

FIFO address    FIFO content

BUFFER MANAGEMENT METHOD BASED ON A BITMAP TABLE

CROSS-REFERENCE TO RELATED APPLICATION

This application is a continuation application of International Application No. PCT/CN2005/002220 filed Dec. 16, 2005, designating the United States and claiming priority from Chinese Patent Application No. 200510000145.2 filed Jan. 5, 2005. The subject matter of both foregoing applications is incorporated herein by reference.

FIELD OF THE INVENTION

The present invention relates to the field of network communication technologies, and in particular to a buffer management method based on a bitmap table.

BACKGROUND OF THE INVENTION

A general architecture of a shared storage-forward switch chip is as illustrated in FIG. 1.

A process of forwarding a data frame by the shared storage-forward switch chip mainly includes the following three steps: receiving and buffering a data frame, forwarding data, and transmitting the data frame and reclaiming a buffer.

Receiving and buffering a data frame: a data frame entering the chip from an external port is buffered into a shared buffer 2 via an input interface 1. The shared buffer 2 is generally a RAM (Random Access Memory). An allocation of the data frame to the shared buffer is managed by a buffer manager 4 using a buffer address pointer. In a subsequent procedure of forwarding the data frame, the body of the data frame will be held in the shared buffer 2 all the time, and only the buffer address pointer will be transferred in the chip. Only after a forwarding instruction is issued and reaches an output interface 3, the output interface 3 reads out the data frame from the shared buffer 2 in accordance with the buffer address pointer, and transmits the data frame to an external port.

Forwarding data: when the data frame is written into the shared buffer 2, the input interface 1 extracts from the data frame the information for forwarding the data frame, and the information together with the buffer address pointer of the data frame is transmitted to a data forwarding channel 5. The data forwarding channel 5 performs forwarding and searching operations on the received information for forwarding so as to obtain a destination port for the data frame, and transmits the buffer address pointer together with information on destination port to the output port 3.

Transmitting the data frame and reclaiming a buffer: the output interface 3 reads out the data frame from the shared buffer 2 in accordance with the buffer address pointer transmitted from the data forwarding channel 5, and transmits the data frame to an external output port in accordance with the information on destination port for the data frame, The buffer manager 4 reclaims the corresponding buffer.

In the above process, the buffer manager 4 manages the allocation and reclaiming of a buffer address pointer of the shared buffer mainly through the following two methods.

One method is to use a FIFO (First In First Out) mode to perform management on allocation and reclaiming of a buffer address pointer of a shared buffer.

Specifically, a FIFO queue is used to hold all idle buffer address pointers of a shared buffer. Each FIFO element in the FIFO queue stores one idle buffer address pointer. The depth of the FIFO queue shall be equal to the total number of the buffer elements in the shared buffer, so that buffer address pointers of all the buffer elements can be stored when all the buffer elements of the shared buffer are idle. A "FIFO read address" is used to indicate the first available idle buffer address pointer in the shared buffer, and a "FIFO write address" is used to indicate a FIFO element where a reclaimed buffer address pointer shall be stored. When the buffer manager 4 allocates a buffer address pointer to the data frame, an idle buffer address pointer is read out in accordance with a "FIFO read address", and the number of idle buffer address pointers in the FIFO queue is decremented by one. When the data frame stored in the buffer is transmitted to the external port, and the buffer address pointer needs to be reclaimed, the buffer address pointer is written into a FIFO element in accordance with a "FIFO write address", and the number of idle buffer address pointers in the FIFO queue is incremented by one.

The FIFO queue can be implemented with a RAM. If the total number of buffer elements in a shared buffer is $2^m$, an $m \times 2^m$ bit RAM is needed for implementation of the FIFO queue. In other words, if the total number of buffer elements in a shared buffer is 8 K, the FIFO queue shall be a RAM of 13 bits×8 K=104 Kbits, with 13 bits of the RAM on average consumed for each buffer element.

When a system is reset, an initial status of the FIFO queue is as illustrated in FIG. 2.

In FIG. 2, assuming that the total number of the buffer elements is 8 K, when the system is reset, none of the buffer elements in the shared buffer stores a data frame. Consequently, all the 8 K buffer address pointers shall be stored in the FIFO queue. At this time, the FIFO is in a "full" status, and the "FIFO read address" is identical to that of the "FIFO write address", both of which are zero.

A FIFO queue during a normal operation is as illustrated in FIG. 3.

In FIG. 3, assuming that a next allocatable buffer address pointer indicated by the "FIFO read address" is stored in a FIFO element with an address of 90 in the FIFO queue, and a next reclaimed buffer address pointer indicated by the "FIFO write address" shall be written into a FIFO element with an address of 56 in the FIFO queue. At this time, the total number of the available buffer address pointers stored in the FIFO queue is 8 K-(90-56).

With the use of this method for management of the shared buffer, a buffer address pointer can be allocated or reclaimed just through one access to the FIFO queue, thus resulting in a powerful capability in allocating and reclaiming the shared buffer and a high efficiency in management of the shared buffer. However, because both the width and the depth of the FIFO queue increase dramatically as the number of the buffer elements in the shared buffer increases, RAM resource consumed for management of each buffer element will increase dramatically. Consequently, this method is not suitable for a switch chip with a shared buffer of a relatively large storage space.

The other method is to use a bitmap table and a FIFO mode for management on the allocation and reclaiming of a buffer address pointer of the shared buffer.

The bitmap table is a two-dimensional table, and each buffer address pointer corresponds to 1 bit in the bitmap table. The bitmap table can be implemented with a RAM.

A common mapping relationship between a buffer address pointer and a bitmap table is that upper n bits of the buffer address pointer are used as a row address in the bitmap table, and lower m bits of the buffer address pointer are used as a column address in the bitmap table. A bit in the bitmap table, determined together by the row and column addresses, when being 1, indicates that a corresponding buffer address pointer has been occupied, and when being 0, indicates that the corresponding buffer address pointer is idle. It may take many clock cycles if an idle buffer address pointer is searched for directly in the bitmap table, and therefore, a small FIFO queue may be used in combination for management of buffer address pointers.

Specifically, some idle buffer address pointers of the shared buffer are preset in a FIFO queue, and two threshold values are set for the FIFO, where one is a search threshold value, i.e. a lower threshold value, and the other is a reclaim threshold value, i.e. an upper filed value. When an idle buffer address pointer stored in the FIFO exceeds the reclaim threshold value, the buffer address pointer above the reclaim threshold value is returned to the bitmap table, and the corresponding bit in the bitmap table is set as 0. When an idle buffer address pointer stored in the FIFO is below the search threshold value, some idle buffer address pointers are searched out automatically from the bitmap table, and are stored into the FIFO, and the corresponding bits in the bitmap table are set as 1.

With the use of this method for management of buffer address pointers, when the system is reset, an initial status of the bitmap table is as illustrated in FIG. 4.

In FIG. 4, the total number of the buffer elements in the shared buffer is 8 K, and the bitmap table has a size of $(2^8 \times 2^5)$ bits. Because the buffer address pointers of 0-31 are stored in the FIFO queue, the bits in the bitmap table, which are corresponding to these buffer address pointers, are set as "1".

A bitmap table during a normal operation is as illustrated in FIG. 5.

In the bitmap table of FIG. 5, the buffer address pointer corresponding to a bit of "1" has been occupied, and a buffer address pointer corresponding to a bit of "0" has not been occupied. Here, the cases in which a buffer address pointer is occupied include: a case in which this buffer address pointer is an idle buffer address pointer, and is stored in the FIFO, or a case in which the buffer element corresponding to this buffer address pointer has been occupied with a data frame.

In allocation of a buffer address pointer, the buffer address pointer is read out from a FIFO in accordance with the "FIFO read address", and the total number of the buffer address pointers stored in the FIFO is decremented by one. In reclaiming of a buffer address pointer, the reclaimed buffer address pointer is written into the FIFO in accordance with the "FIFO write address", and the total number of the buffer address pointers stored in the FIFO is incremented by one.

Normally, this method can achieve that a buffer address pointer is allocated or reclaimed in one clock cycle, thus alleviating the speed problem of direct searching for an idle buffer pointer in the bitmap table. However, if the total number of buffer address pointers allocated or reclaimed sequentially exceeds the depth of the FIFO, making the FIFO reach a limit status, it shall be required to have a direct read or write access to the bitmap table, and consequently, the efficiency in the access to an buffer address pointer may be degraded greatly.

With the use of this method for management of the shared buffer, RAM resource consumed for management of each buffer element is 1 bit, and does not vary with the number of the buffer elements, with low resources being consumed. However, this method may not be steady in time consumption in searching for an idle buffer address pointer, and may be of a weak capability in allocating and reclaiming a buffer address pointer especially when the FIFO is in a limit status, and therefore results in a greatly reduced efficiency in management of the shared buffer. This method may not be suitable for a switch chip with a relatively large exchange bandwidth.

SUMMARY OF THE INVENTION

An object of the invention is to provide a buffer management method based on a bitmap table, which can improve the efficiency in buffer management to a maximal extent while having resources consumed as little as possible.

To attain this object, an embodiment of the invention provides a buffer management method based on a bitmap table, including determining and recording an idleness status of each of a plurality of areas in a bitmap table in accordance with an unoccupied status of a bit in each of the plurality of areas, wherein the bitmap table is divided into the plurality of areas each containing at least one bit; managing buffer address pointers in accordance with the recorded idleness status of each of the areas; wherein the buffer address pointers respectively correspond to addresses of unoccupied bits of the bitmap table.

A buffer management device is provided. The buffer management device includes one or more components for performing buffer management based on a bitmap table, the one or more components configured to determine and record an idleness status of each of a plurality of areas in a bitmap table in accordance with an unoccupied status of a bit in each of the plurality of areas, wherein the bitmap table is divided into the plurality of areas each containing at least one bit; manage buffer address pointers in accordance with the recorded idleness status of each of the areas; wherein the buffer address pointers respectively correspond to addresses of unoccupied bits of the bitmap table.

BRIEF DESCRIPTIONS OF THE DRAWINGS

FIG. 3 is a schematic diagram of a FIFO queue during a normal operation in the prior art;

FIG. 4 is a schematic diagram of an initial status of a bitmap table in the prior art;

FIG. 5 is a schematic diagram of a bitmap table during a normal operation in the prior art;

FIG. 6 is a schematic diagram of an initial status of a bitmap table according to an embodiment of the invention;

DETAILED DESCRIPTION

Figure 1:
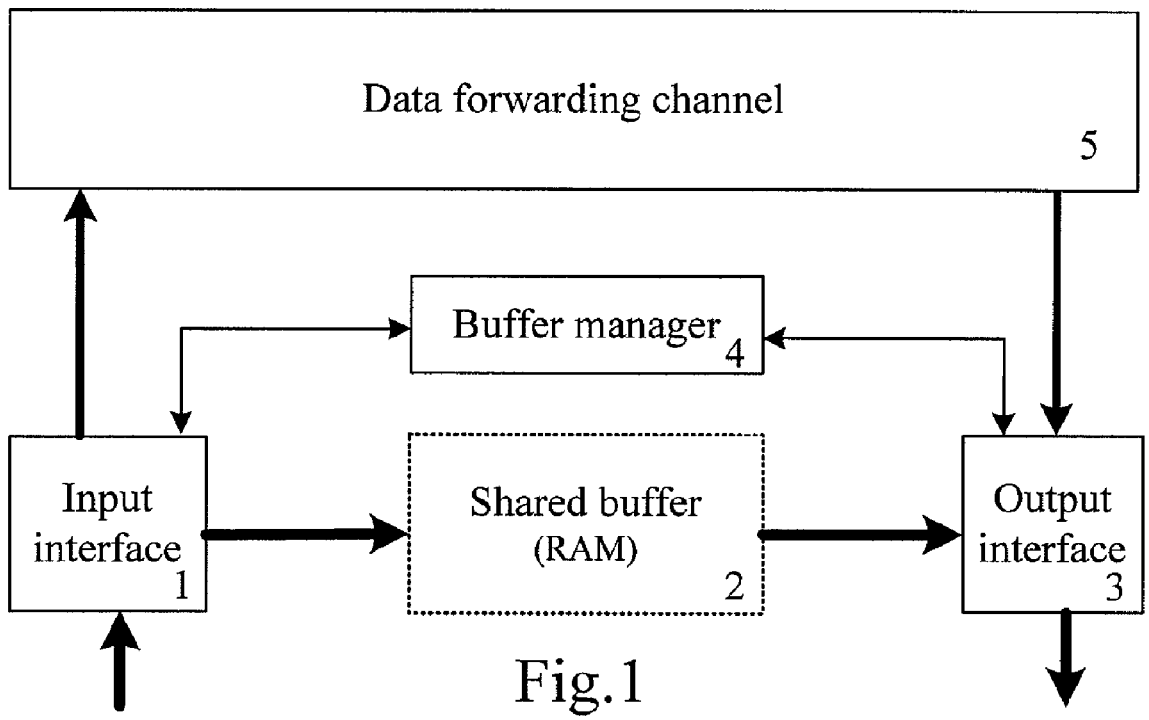
FIG. 1 is a schematic diagram of a general architecture for a shared storage-forward switch chip.
Figure 2:
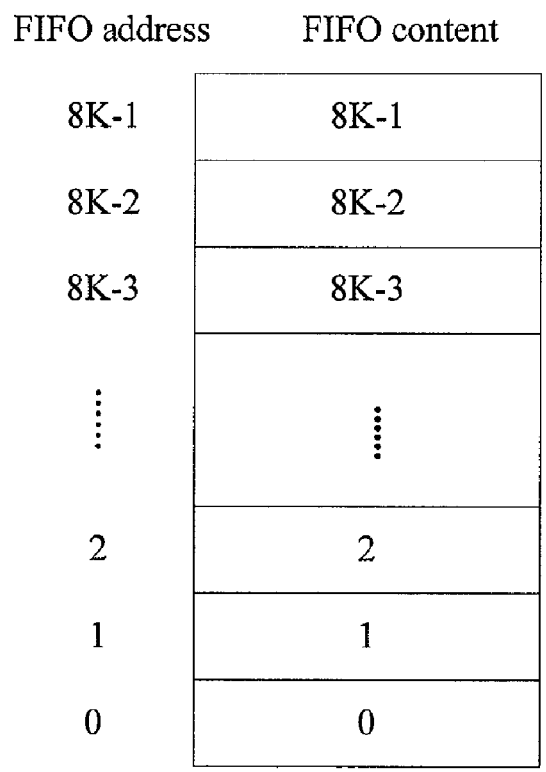
FIG. 2 is a schematic diagram of an initial status of a FIFO queue in the prior art.

According to an embodiment of the invention, a bitmap table is divided into several areas each including at least one bit, and an idleness status of each area is determined and stored in accordance with an unoccupied status of a bit in each area respectively, and a buffer address pointer is managed in accordance with the stored idleness status of each area.

Hereinafter, the technical solutions provided by the invention will be described further.

The buffer management method according to an embodiment is bitmap table-based, and hence will be applicable in any case where a bitmap table is used in buffer management. The buffer used here includes a shared buffer.

According to an embodiment of the invention, firstly a bitmap table is divided into several areas, and then it is determined whether each area is an idle area in accordance with an unoccupied status of a bit contained in the area, and an area in an idleness status is recorded. For example, the address of the idle area is stored. Thus, in allocating a buffer address pointer, these stored addresses of idle areas can be used to search an idle buffer address pointer in corresponding areas in the bitmap table, and at least one idle buffer address pointer can be obtained. The above stored idle area shall vary dynamically with an occupied status of the bit in the area during the allocation and reclaiming of a buffer address pointer, so as to ensure that the stored idle area must contain a bit in an unoccupied status, and that an idle area which contains a predetermined number of bits in an unoccupied status must be stored.

A division of a bitmap table into areas will be detailed below by way of an example in which the bitmap table is divided in unit of row.

It is assumed that a shared buffer is provided with buffer elements, the number of which is 8 K, and that a bitmap table for the shared buffer is a two-dimensional table with rows and columns of $(2^8 \times 2^5)$ bits respectively.

The bitmap table is divided into areas in unit of row, and hence can be divided into $2^8$ areas. The address of each area can be determined to be respective row address of the bitmap table.

If the number of bits in an unoccupied status contained in an area reaches a predetermined number, the area is determined as an idle area, and the address of the idle area, i.e. the corresponding row address in the bitmap table, is stored. The address of the idle area can be stored in a FIFO queue or a stack.

The above predetermined number may be a minimum of 1 and a maximum which shall be smaller than the total number of columns in the bitmap table. The predetermined number can be selected as needed practically in a communication system.

To distinguish it from a FIFO queue in the prior art, in the present embodiment, a FIFO queue for storing addresses of idle areas will be referred to as a row idle indication FIFO.

If a shared buffer with 8 K buffer elements corresponds to a bitmap table of $(2^8 \times 2^5)$ bits, and a row idle indication FIFO is used to store addresses of idle areas, the depth of the FIFO queue shall be $2^8$, and the width of the FIFO queue shall be 8 bits.

If a RAM is used to implement the row idle indication FIFO, assuming that the number of buffer elements in a shared buffer is $2^x$, then the RAM resources consumed for management of each buffer element are $(2^x+(x-5)\times 2^{(x-5)})/2^x=1+(x-5)/32$, approximately 1 bit, where relatively fewer resources are consumed, and when the number of buffer elements increases considerably, the variance of the RAM resources consumed for management of each buffer element will be so small that it can be considered that the RAM resources consumed for management of each buffer element will substantially not vary with the number of the buffer elements.

For convenience of description, the buffer management procedure according to an embodiment will be explained by way of an example in which the predetermined number is 1, and an idle area address is stored in a row idle indication FIFO queue.

A "FIFO read address" of the row idle indication FIFO indicates an address of a next area in the queue that contains at least one bit in an unoccupied status, i.e., a corresponding row address in the bitmap table, and a "FIFO write address" indicates a FIFO element which shall store a row address of a row in the Bitmap table when the row changes from containing no bit in an unoccupied status to containing at least one bit in an unoccupied status.

Figure 7:
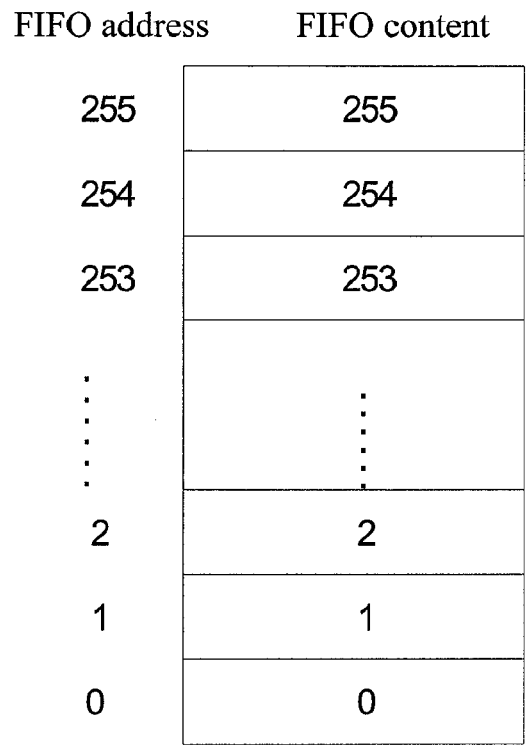
FIG. 7 is a schematic diagram of an initial status of a FIFO queue according to an embodiment of the invention.

When a system is reset, no data frame is stored in the buffer, and all the bits in the bitmap table are in an unoccupied status, as illustrated in FIG. 6. At this time, the row idle indication FIFO shall store row addresses of all the rows in the bitmap table. As illustrated in FIG. 7, the row idle indication FIFO stores 256 row addresses, and hence is in a "full" status; the "FIFO read address" of the row idle indication FIFO and the "FIFO write address" are the same, i.e. 0. Because the depth of the FIFO is the number of the rows in the bitmap table, an overflow phenomenon will not occur in the row idle indication FIFO.

When it is required to allocate a buffer address pointer to a data frame, a row address is read out from the row idle indication FIFO in accordance with the "FIFO read address", and a bit in an unoccupied status is searched for and obtained in a corresponding row in the bitmap table in accordance with the row address. An idle buffer address pointer can be determined from the obtained bit in an unoccupied status, and the data frame is stored in a buffer in accordance with the buffer address pointer. The status of the bit in an unoccupied status in the bitmap table is changed from an unoccupied status to an occupied status, and it is determined whether a row where the bit is located further contains at least one bit in an unoccupied status. If the row contains at least one bit in an unoccupied status, it indicates that the area is still an idle area, and that its address shall still be stored in the row idle indication FIFO; the "FIFO read address" of the row idle indication FIFO is not changed and the present procedure of allocating a buffer address pointer is completed; and if all bits in the row are in occupied status, it indicates that the area is no longer an idle area, and that its address shall not be stored in the row idle indication FIFO any longer, with the "FIFO read address" being incremented by one; the present procedure of allocating a buffer address pointer is completed.

When it is required to reclaim a buffer address pointer upon transmission of a data frame to an external port, a bit in the bitmap table corresponding to the buffer address pointer required to be reclaimed is determined in accordance with the pointer, and it is determined whether all bits in a row where the bit is located are in an occupied status. If all the bits in the row are in an occupied status, a row address of the row where the bit is located is required to be stored in the row idle indication FIFO after the bit corresponding to the buffer address pointer required to be reclaimed is changed from being in an occupied status to being in an unoccupied status, and the row address of the row is stored in a corresponding FIFO element in accordance with the "FIFO write address", with the "FIFO write address" being incremented by one, and the present procedure of reclaiming a buffer address pointer is completed; or if not all the bits in the row where the bit is located are in an occupied status, the bit is changed from an occupied status to an unoccupied status directly, and the present procedure of reclaiming a buffer address pointer is completed.

If a buffer address pointer is required to be allocated at the same time a buffer address pointer is required to be reclaimed upon transmission of a data frame to an external port, the buffer address pointer required to be reclaimed can be allocated directly, without any operation on the row idle indication FIFO and the bitmap table, thus further improving the efficiency in allocating and reclaiming a buffer address pointer.

When the row idle indication FIFO of the present invention is implemented by a RAM, if the RAM is a RAM with 1RW (one read and write port), a specific procedure of implementing the allocation of a buffer address pointer will be explained with reference to FIG. 8.

Figure 8:
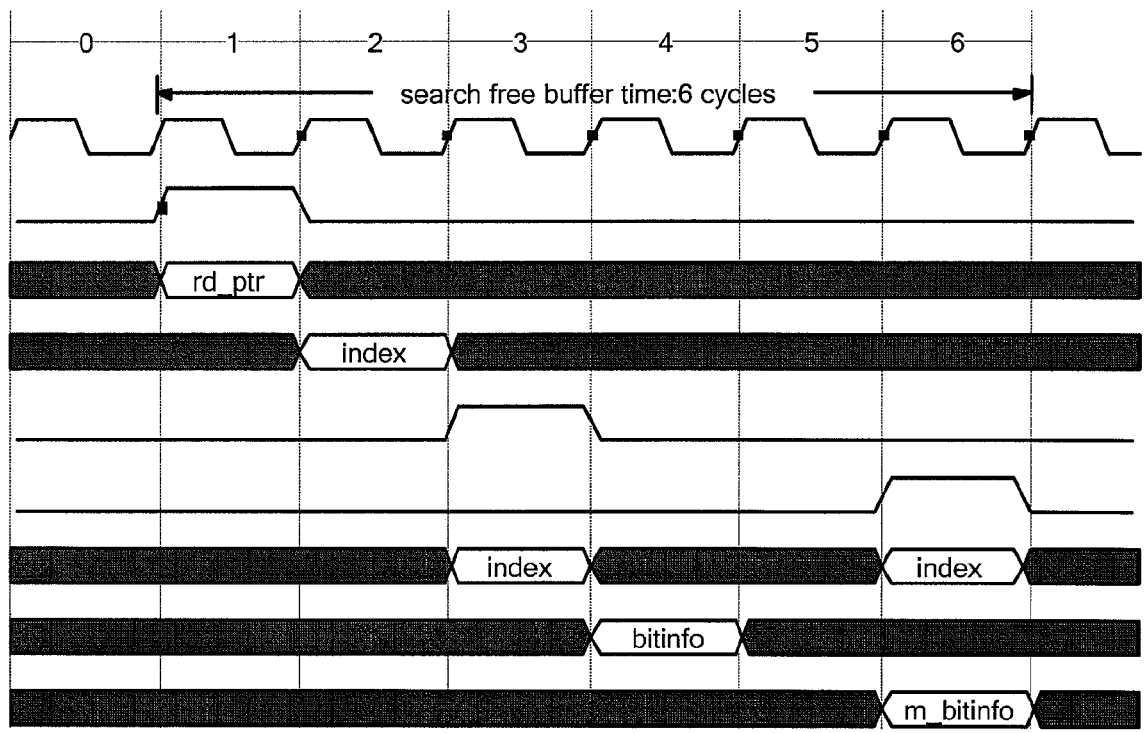
FIG. 8 is a timing diagram 1 of allocating a buffer address pointer according to an embodiment of the invention.

As illustrated in FIG. 8, in clock cycle 1, if the row idle indication FIFO is non-empty, i.e., there is an idle buffer element in the buffer, a row address is read out from the row idle indication FIFO in accordance with the "FIFO read address", and with a response time of the RAM elapsing, the readout row address becomes valid in clock cycle 2.

In clock cycle 3, an access to the bitmap table is made with the row address, and row information in the bitmap table corresponding to the row address is read out. In the present embodiment, the bitmap table is assumed to be implemented with a RAM, and includes 256 rows and 32 columns, and thus row information readout from the bitmap table is of 32 bit. With a response time of the RAM elapsing, the readout row information becomes valid in clock cycle 4.

In clock cycle 5, a bit in an unoccupied status is searched for in the readout row information, and an idle buffer address pointer corresponding to the bit is determined. In the present embodiment, a buffer address pointer is of 13 bit, and can be determined from a row address and a column address of the bitmap table. For instance, upper 8 bits of a buffer address pointer indicate a row address of the bitmap table, and lower 5 bits of the buffer address pointer indicate a column address of the bitmap table.

In clock cycle 6, the bit in an unoccupied status searched out from the row information is modified to be in an occupied status, and the modified row information is written back into the corresponding row in the bitmap table.

It is determined whether all bits in the written-back row information are in an occupied status. If they are all in an occupied status, it indicates that buffer address pointers corresponding to all the bits in the row of the bitmap table have been allocated and occupied; the row address shall not be stored in the row idle indication FIFO any longer; and the "FIFO read address" of the row idle indication FIFO is incremented by one, pointing to a next valid row address index; or if the written-back row information still contains a bit in an unoccupied status, it indicates that the row in the bitmap table contains at least one bit in an unoccupied status, and the row address shall still be stored in the row idle indication FIFO. No operation is performed on the "FIFO read address" of the row idle indication FIFO, and the row address is still stored in the row idle indication FIFO.

Figure 9:
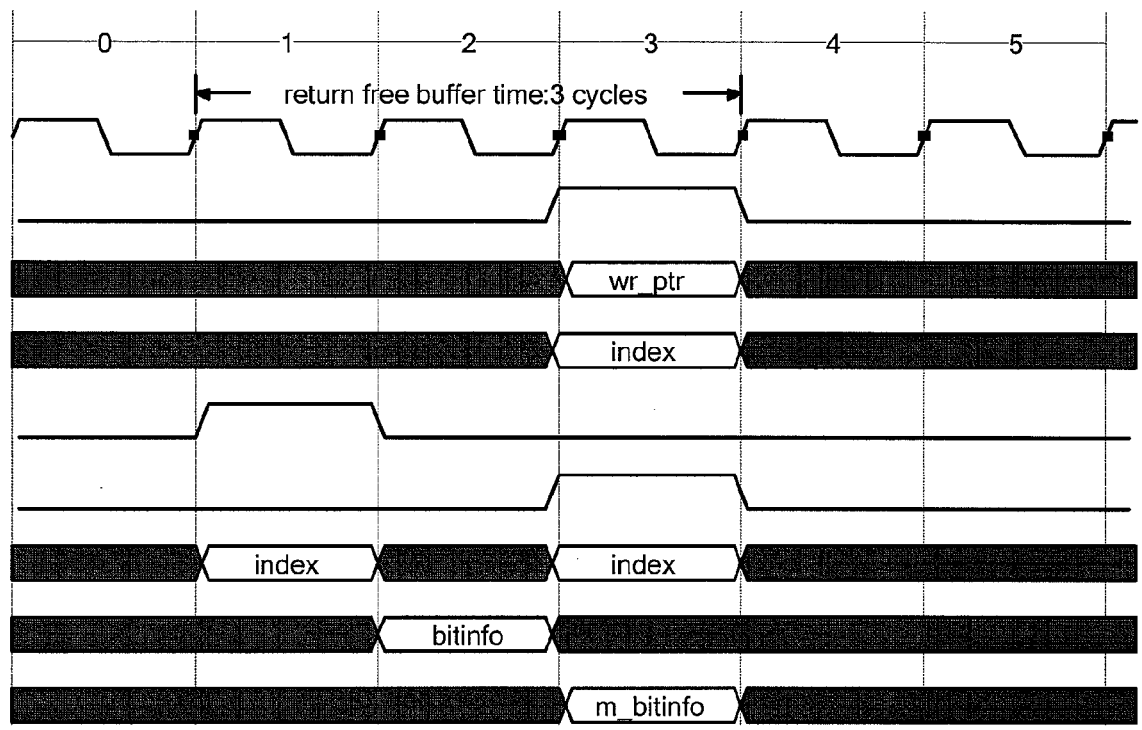
FIG. 9 is a timing diagram of reclaiming a buffer address pointer according to an embodiment of the invention.

If the row idle indication FIFO is a RAM with 1RW, a specific procedure of implementing the reclaiming of a buffer address pointer is as illustrated in FIG. 9.

As illustrated in FIG. 9, in clock cycle 1, upper 8 bits of a buffer address pointer to be reclaimed are used as a read address for reading out row information from the bitmap table. With a response time of the RAM elapsing, the readout row information becomes valid in clock cycle 2.

In clock cycle 3, lower 5 bits of the buffer address pointer to be reclaimed are used as a column address, corresponding bits in the readout row information are changed to an unoccupied status, and the modified row information is written back into the corresponding row in the bitmap table.

If all bits of the row information in the bitmap table are in an occupied status, it indicates that buffer address pointers corresponding to all the bits in the row of the bitmap table have been allocated and occupied before reclaiming the buffer pointer, and that the row address is not stored in the row idle indication FIFO. After reclaiming the buffer address pointer, the row contains one bit in an unoccupied status, and the row address shall be stored in the row idle indication FIFO. The row address of the row is stored in a corresponding FIFO element in accordance with the "FIFO write address", with the "FIFO write address" being incremented by one. If the row information readout from the bitmap table contains a bit in an unoccupied status, it indicates that the buffer address pointers corresponding to all the bits in the row of the bitmap table have not been all allocated and occupied, and that the row address has been stored in the row idle indication FIFO, and no operation is performed on the "FIFO write address" of the row idle indication FIFO.

As obvious from the descriptions of FIG. 9, it can be achieved by the present invention that one buffer address pointer is reclaimed per three clock cycles on average, thus improving the efficiency in reclaiming a buffer address pointer to a maximal extent while having relatively fewer resources consumed.

If the row idle indication FIFO is implemented by a RAM with 1R1W (one read port and one write port), and at least three row addresses are stored in the row idle indication FIFO, the procedure of searching for a buffer address pointer can be accomplished in a streamline way, further improving the rate at which a buffer address pointer being allocated. Hereinafter, a specific procedure of implementing the allocation of a buffer address pointer will be explained with reference to FIG. 10.

Figure 10:
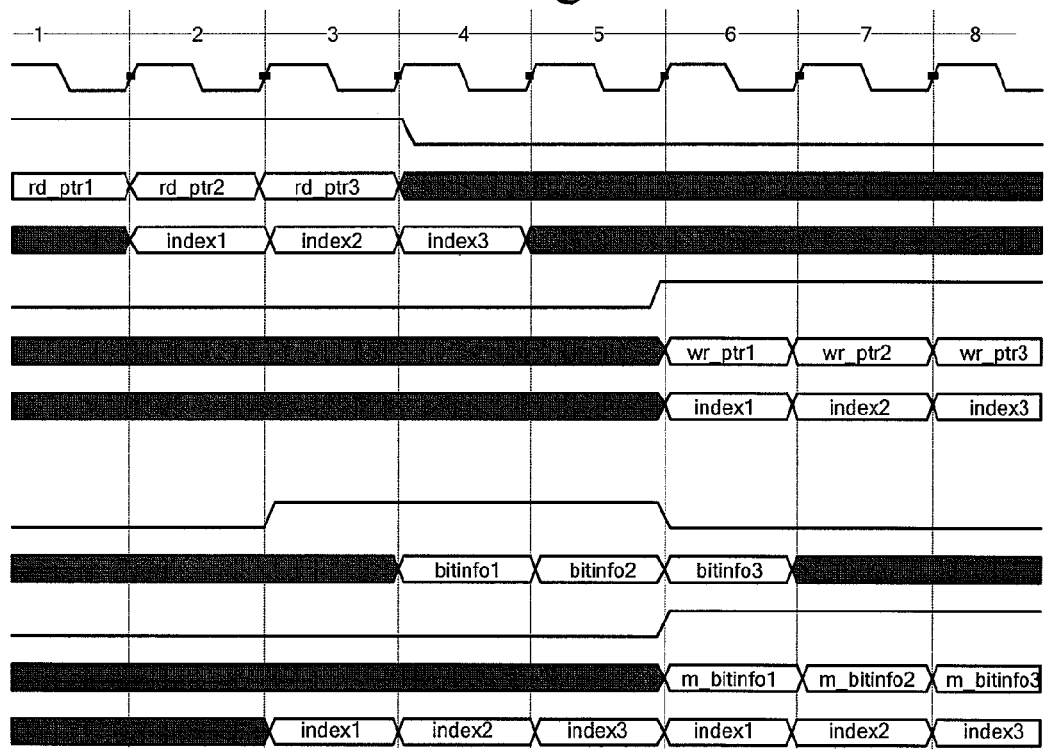
FIG. 10 is a timing diagram 2 of allocating a buffer address pointer according to an embodiment of the invention.

As illustrated in FIG. 10, in clock cycles 1, 2 and 3, three row addresses are read out sequentially from the row idle indication FIFO in accordance with the "FIFO read address" of the row idle indication FIFO. With a response time of the RAM elapsing, the readout row addresses become valid in clock cycles 2, 3 and 4 respectively. During the sequential reading out of the row addresses, the "FIFO read address" is incremented by one each time a read operation is performed.

Respectively in clock cycles 3, 4 and 5, a corresponding read-out row address is used for an access to the bitmap table, and respective row information in the bitmap table corresponding to the three row addresses is read out sequentially. In the present embodiment, the bitmap table is assumed to be implemented with a RAM, and includes 256 rows and 32 columns, and all the three pieces of row information are of 32 bits. With a response time of the RAM elapsing, the read-out three pieces of row information become valid respectively in clock cycles 4, 5 and 6.

In clock cycles 5, 6 and 7, one bit in an unoccupied status is searched respectively in each of the read-out three pieces of row information, and idle buffer address pointers respectively corresponding to the three bit are determined. In the present embodiment, a buffer address pointer is of 13 bit, which can be determined from a row address and a column address of the bitmap table. For instance, upper 8 bits of a buffer address pointer indicate a row address of the bitmap table, and lower 5 bits of the buffer address pointer indicate a column address of the bitmap table.

In clock cycles 6, 7 and 8, the bits in an unoccupied status searched out respectively from the three pieces of row information are modified to be in an occupied status, and then the modified three pieces of row information are written back into the corresponding rows of the bitmap table.

It is determined respectively whether all bits in the three pieces of the written-back row information are in an occupied status. If they are all in an occupied status, it indicates that buffer address pointers corresponding to all the bits in the row of the bitmap table have been allocated and occupied, and the row address shall not be stored in the row idle indication FIFO any longer, and the "FIFO read address" of the row idle indication FIFO is incremented by one, pointing to a next valid row address index; or if the written-back row information still contains a bit in an unoccupied status, it indicates that the row of the bitmap table contains at least one bit in an unoccupied status, and that the row address shall still be stored in the row idle indication FIFO; no operation is performed on the "FIFO read address" of the row idle indication FIFO, and the row address is still stored in the row idle indication FIFO.

As obvious from the descriptions of FIG. 10, it can be achieved by the present invention that one idle buffer address pointer is allocated per two clock cycles on average, satisfying a design demand that one buffer address pointer shall be allocated per two clock cycles. If a relatively fewer resources are consumed, the efficiency in allocating a buffer address pointer can be improved to a maximal extent, and hence the capability in buffer management can be improved.

The above embodiments have been described with respect to addresses of idle areas stored in a FIFO queue, and the addresses of the idle areas can also be stored in a stack. When a stack is used for buffer management, the implementation principle and procedure thereof are substantially identical to those as described above, and thus will not be detailed here.

In the above embodiments, the bitmap table has been described as having $2^n$ rows, where n is a positive integer. Thus, the bitmap table shall be divided into n areas, and the width m of the FIFO queue equals to $\log_2 n$ if $\log_2 n$ is an integer, or equals to $(int(\log_2 n)+1)$ if $\log_2 n$ is not an integer. Other implementation procedures are identical to those as described above, and thus will not be detailed here.

As obvious from the above descriptions of the technical solutions, according to the embodiments of the invention, in allocation of a buffer address pointer, by dividing a bitmap table into several areas and storing addresses of idle areas, at least one idle buffer address pointer can be obtained in accordance with the stored idle area address, provided that there is an idle buffer element in the buffer, so that the procedure of allocating a buffer address pointer can be fixed and easily manageable. When a RAM is used to implement the FIFO for storage of an idle area address, the RAM resources consumed for management of each buffer element is 1 bit, with fewer resources being consumed, and will substantially not vary with the number of the buffer elements; and according to an embodiment, one procedure of reclaiming a buffer address can be accomplished in three clock cycles on average, and when the RAM is a RAM with one read port and one write port, one procedure of allocating a buffer address pointer can be accomplished in two clock cycles on average, resulting in an improved efficiency in allocating and reclaiming a buffer address pointer. Therefore, the technical solutions provided by the present invention can improve controllability of buffer management, and can improve efficiency of buffer management to a maximal extent while having resources consumed as little as possible, and hence the embodiments of the invention can be well applied to a switch chip having a relatively large exchange bandwidth.

Although the invention has been described with reference to the embodiments thereof, it shall be appreciated by those skilled in the art that various modifications and variations can be made to the invention without departing from the spirit of the invention, and accordingly, the following claims are intended to embrace the modifications and variations.

The invention claimed is:

1. A buffer management method based on a bitmap table, comprising:
   determining and recording an idleness status of each of plurality of areas in a bitmap table in accordance with an unoccupied status of a bit in each of the area;
   obtaining an address of an idle area of the bitmap table from a First In First Out queue, wherein the bitmap table is a table with n rows; the bitmap table is divided into n areas in unit of row of the bitmap table; and row addresses of the bitmap table are respectively the address of each of the areas, the addresses of the idle areas are stored in the First In First Out queue, and a depth and a width of the First In First Out queue are n and m respectively, and if $\log_2 n$ is an integer, $m=\log_2 n$, otherwise $m=(int(\log_2 n)+1)$; n and m are positive integers;
   obtaining a bit in an unoccupied status in the idle area corresponding to the address of the idle area;
   obtaining an buffer address pointer corresponding to the bit in an unoccupied status; and
   allocating the buffer address pointer to a data frame.

2. The buffer management method based on a bitmap table according to claim 1, wherein the determining and recording an idleness status of each of a plurality of areas in the bitmap table in accordance with an unoccupied status of a bit in each of the idle area comprises:
   determining an address of each of the areas;
   determining areas, which contain at least a predetermined number of bits in an unoccupied status, as idle areas; and
   storing addresses of the idle areas.

3. The buffer management method based on a bitmap table according to claim 2, wherein
   the predetermined number is at least one.

4. The buffer management method based on a bitmap table according to claim 1, wherein
   a read address of the First In First Out queue indicates an address of a next idle area stored in the First In First Out queue;
   a write address of the First In First Out queue indicates a storage element of the First In First Out queue to store an address of a next idle area; and
   the initial status of the First In First Out queue is a full status, with addresses of each areas being stored.

5. The buffer management method based on a bitmap table according to claim 1, further comprising:
   setting the bit in the bitmap table corresponding to the buffer address pointer as an occupied status; and
   deleting the stored address of the area upon determination that the number of bits in an unoccupied status contained in the area does not reach the predetermined number.

6. The buffer management method based on a bitmap table according to claim 1, further comprising:
   setting a bit in the bitmap table corresponding to a reclaimed buffer address pointer as an unoccupied status; and
   storing the address of a area when it is determined that the number of bits in an unoccupied status contained in the area reaches the predetermined number and the address of the area has not been stored.

7. The buffer management method based on a bitmap table according to claim 1, further comprising:
   if a buffer address pointer is required to be allocated and a buffer address pointer is required to be reclaimed simultaneously, directly allocating the reclaimed buffer address pointer.

8. A method of allocating a buffer address pointer based on a bitmap table, comprising:
   determining an address of an idle area of a plurality of areas in the bitmap table;
   looking up for a bit in an unoccupied status in the idle area according to the address of the idle area and determining an address of the bit;

obtaining the buffer address pointer corresponding to the address of the bit and allocating the buffer address pointer; and allocating the buffer address pointer to a data frame;

wherein the bitmap table is divided into the plurality of areas each containing at least one bit in unit of row of the bitmap table, the idle area contains at least one unoccupied bit;

an address of an unoccupied bit in the bitmap table corresponds to an address pointer of an unoccupied buffer, the addresses of the idle areas are stored in a First In First Out queue;

the bitmap table is a table with n rows; and a depth and a width of the First In First Out queue are n and m respectively, and if $\log_2 n$ is an integer, $m=\log_2 n$, otherwise $m=(\text{int}(\log_2 n)+1)$; n and m are positive integers.

9. The method of allocating a buffer address pointer based on a bitmap table according to claim 8, wherein after allocating the buffer address pointer corresponding to the address of the bit in an unoccupied status, the bit in an unoccupied status is changed to be in an occupied status.

10. The method of allocating a buffer address pointer based on a bitmap table according to claim 8, further comprising:

determining an address of each of the areas;

determining areas, which contain at least a predetermined number of bits in an unoccupied status, as idle areas; and storing addresses of the idle areas.

11. The method of allocating a buffer address pointer based on a bitmap table according to claim 10, wherein the predetermined number is at least one.

12. The method of allocating a buffer address pointer based on a bitmap table according to claim 8, further comprising:

setting a bit in the bitmap table corresponding to a reclaimed buffer address pointer as an unoccupied status; and storing the address of a area when it is determined that the number of bits in an unoccupied status contained in the area reaches the predetermined number and the address of the area has not been stored.

13. The method of allocating a buffer address pointer based on a bitmap table according to claim 8, further comprising:

if a buffer address pointer is required to allocated and a buffer address pointer is required to reclaimed simultaneously, directly allocating the reclaimed buffer address pointer.

14. A device, comprising:

one or more components for allocating a buffer address pointer based on a bitmap table, the one or more components configured to determine an address of an idle area of a plurality of areas in the bitmap table;

look up for a bit in an unoccupied status in the idle area according to the address of the idle area and determine an address of the bit;

obtain the buffer address pointer corresponding to the address of the bit and allocate the buffer address pointer;

wherein the bitmap is divided into the plurality of areas in unit of row of the bitmap table, the idle area contains at least one unoccupied bit;

an address of an unoccupied bit in the bitmap table corresponds to address pointer of an unoccupied buffer, the addresses of the idle areas are stored in a First In First Out queue;

the bitmap table is a table with n rows; and a depth and a width of the First In First Out queue are n and m respectively, and if $\log_2 n$ is an integer, $m=\log_2 n$, otherwise $m=(\text{int}(\log_2 n)+1)$; n and m are positive integers.

15. The device according to claim 14, wherein the one or more components further configured to:

set the bit in the bitmap table corresponding to the buffer address pointer as an occupied status; and delete the stored address of the area upon determination that the number of bits in an unoccupied status contained in the area does not reach the predetermined number.

16. The device according to claim 14, wherein the one or more components further configured to:

determine an address of each of the areas;

determine areas, which contain at least a predetermined number of bits in an unoccupied status, as idle areas; and store addresses of the idle areas.

17. The device according to claim 14, wherein the one or more components further configured to:

set a bit in the bitmap table corresponding to a reclaimed buffer address pointer as an unoccupied status; and store the address of a area when it is determined that the number of bits in an unoccupied status contained in the area reaches the predetermined number and the address of the area has not been stored.

18. The device according to claim 14, wherein the one or more components further configured to:

if a buffer address pointer is required to allocated and a buffer address pointer is required to reclaimed simultaneously, directly allocate the reclaimed buffer address pointer.

* * * * *

UNITED STATES PATENT AND TRADEMARK OFFICE
CERTIFICATE OF CORRECTION

| | |
|---|---|
| PATENT NO. | : 7,733,892 B2 |
| APPLICATION NO. | : 11/773733 |
| DATED | : June 8, 2010 |
| INVENTOR(S) | : Jingjie Cui and Yu Lin |

Page 1 of 1

It is certified that error appears in the above-identified patent and that said Letters Patent is hereby corrected as shown below:

IN THE CLAIMS:

Column 9, Claim 1, line 66, before "plurality" insert -- a --.

Signed and Sealed this

Thirty-first Day of August, 2010

David J. Kappos
*Director of the United States Patent and Trademark Office*